United States Patent
Wu et al.

(10) Patent No.: US 9,651,705 B2
(45) Date of Patent: May 16, 2017

(54) REDUCING CONDUCTIVE CASING EFFECT IN TRANSIENT CASED-HOLE RESISTIVITY LOGGING

(71) Applicant: Halliburton Energy Services, Inc., Houston, TX (US)

(72) Inventors: Dagang Wu, Katy, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 14 days.

(21) Appl. No.: 14/437,420

(22) PCT Filed: Nov. 21, 2012

(86) PCT No.: PCT/US2012/066312
§ 371 (c)(1),
(2) Date: Apr. 21, 2015

(87) PCT Pub. No.: WO2014/081428
PCT Pub. Date: May 30, 2014

(65) Prior Publication Data
US 2015/0276970 A1    Oct. 1, 2015

(51) Int. Cl.
| | |
|---|---|
| *G01V 3/26* | (2006.01) |
| *E21B 49/00* | (2006.01) |
| *E21B 47/00* | (2012.01) |
| *G01V 3/28* | (2006.01) |

(52) U.S. Cl.
CPC ............... *G01V 3/26* (2013.01); *E21B 47/00* (2013.01); *E21B 49/003* (2013.01); *G01V 3/28* (2013.01)

(58) Field of Classification Search
CPC .. G01V 3/26; G01V 3/28; E21B 47/00; E21B 49/003
See application file for complete search history.

(56) References Cited

U.S. PATENT DOCUMENTS

| | | | |
|---|---|---|---|
| 6,294,917 B1 | 9/2001 | Nichols | |
| 7,388,382 B2 | 6/2008 | Strack et al. | |
| 8,008,919 B2 | 8/2011 | Wang et al. | |
| 2007/0156359 A1* | 7/2007 | Varsamis | G01V 1/44 702/69 |

(Continued)

FOREIGN PATENT DOCUMENTS

| | | | | |
|---|---|---|---|---|
| RU | WO 2006066047 A1 * | 6/2006 | ............... | G01V 3/28 |
| WO | 0120367 A1 | 3/2001 | | |

(Continued)

OTHER PUBLICATIONS

Discovery House, Australian Government IP Australia, Patent Examination Report No. 1, Patent Application No. 2012394955, which is an AU counterpart of the instant application, Jan. 7, 2016.

(Continued)

*Primary Examiner* — Manuel L Barbee
(74) *Attorney, Agent, or Firm* — Howard L. Speight, PLLC

(57) ABSTRACT

A first broadband magnetic field is induced at a first transmitter position in a well bore drilled through a formation. A first formation magnetic field induced by the first broadband magnetic field is detected at a first receiver position. A second formation magnetic field induced by the first broadband magnetic field is detected at a second receiver position. A second broadband magnetic field is induced at a second transmitter position in the well bore. A third formation magnetic field induced by the second broadband magnetic field is detected at the first receiver position. A fourth formation magnetic field induced by the second broadband magnetic field is detected at the second receiver position. A formation property is computed using a function of the first, second, third, and fourth formation magnetic fields, wherein the function reduces the effect of a casing on the computation of the formation property.

19 Claims, 7 Drawing Sheets

(56) References Cited

U.S. PATENT DOCUMENTS

| | | | |
|---|---|---|---|
| 2009/0030616 A1* | 1/2009 | Sugiura | G01V 11/00 702/9 |
| 2009/0091328 A1 | 4/2009 | Clark et al. | |
| 2009/0302852 A1* | 12/2009 | Levesque | G01V 3/30 324/338 |
| 2010/0134113 A1* | 6/2010 | DePavia | G01V 3/28 324/346 |

FOREIGN PATENT DOCUMENTS

| | | |
|---|---|---|
| WO | 2006066047 A1 | 6/2006 |
| WO | 2008076130 A1 | 6/2008 |
| WO | 2009045938 A2 | 4/2009 |
| WO | 2012023926 A1 | 2/2012 |

OTHER PUBLICATIONS

European Patent Office, European Search Report, Application No./Patent No. 12888637.1 1559 / 2923233 PCT/US2012066312, which is an EP counterpart to the instant application, Mar. 9, 2016.

International Preliminary Examining Authority, International Preliminary Report on Patentability, International Application No. PCT/US12/66312, which is the PCT parent of the instant application, Jan. 29, 2015.

International Searching Authority, International Search Report and Written Opinion, International Application No. PCT/US12/66312, which is the parent PCT of the instant application, Feb. 8, 2013.

Australian Government IP Australia, Notice of Acceptance, Application No. 2012394955, which is an AU counterpart to the instant application, Aug. 16, 2016.

\* cited by examiner

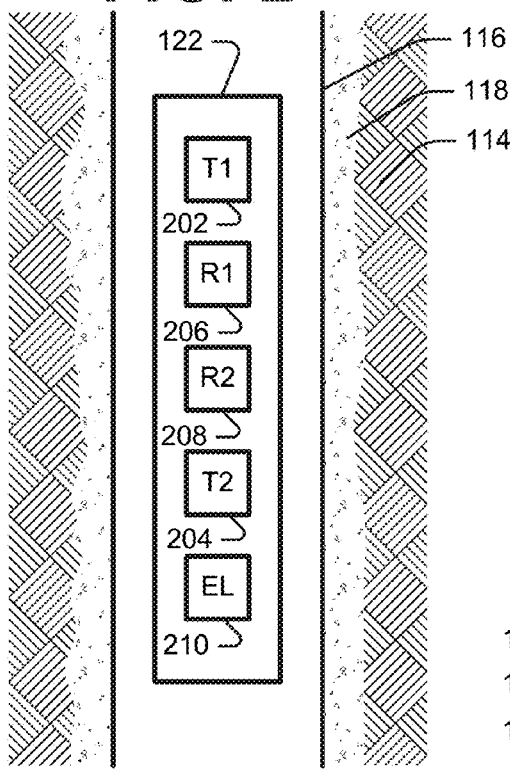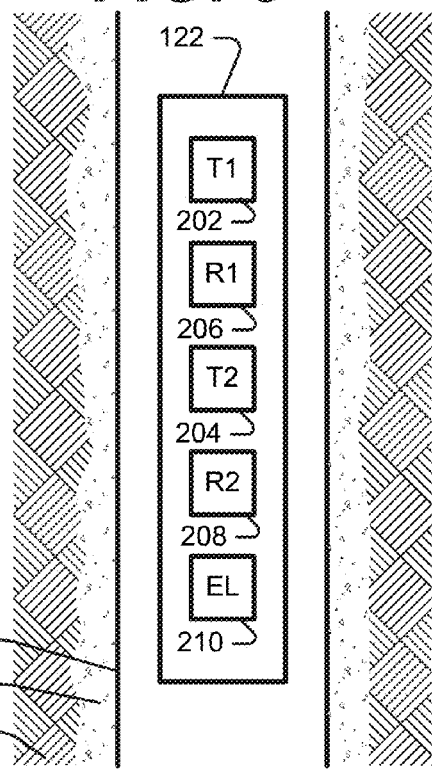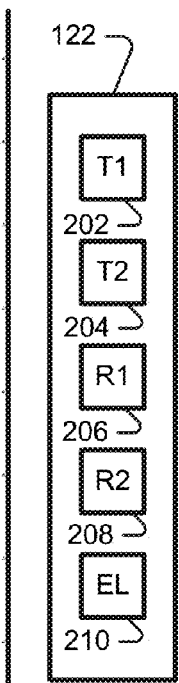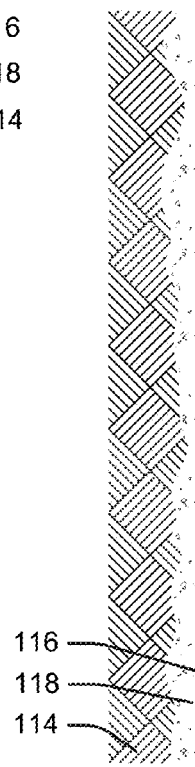

REDUCING CONDUCTIVE CASING EFFECT IN TRANSIENT CASED-HOLE RESISTIVITY LOGGING

BACKGROUND

When a well for the production of hydrocarbons is completed, it is often lined by a casing. The casing is often made of a conductive metal. It can be useful to perform logging activities in a well after it is completed. For example, it is often useful to evaluate properties of a formation or to map a reservoir. Performing such activities in a well with a conductive casing can be a challenge.

BRIEF DESCRIPTION OF THE DRAWINGS

FIGS. 2-5 are schematic representations of a resistivity logging tool.

DETAILED DESCRIPTION

Figure 1:
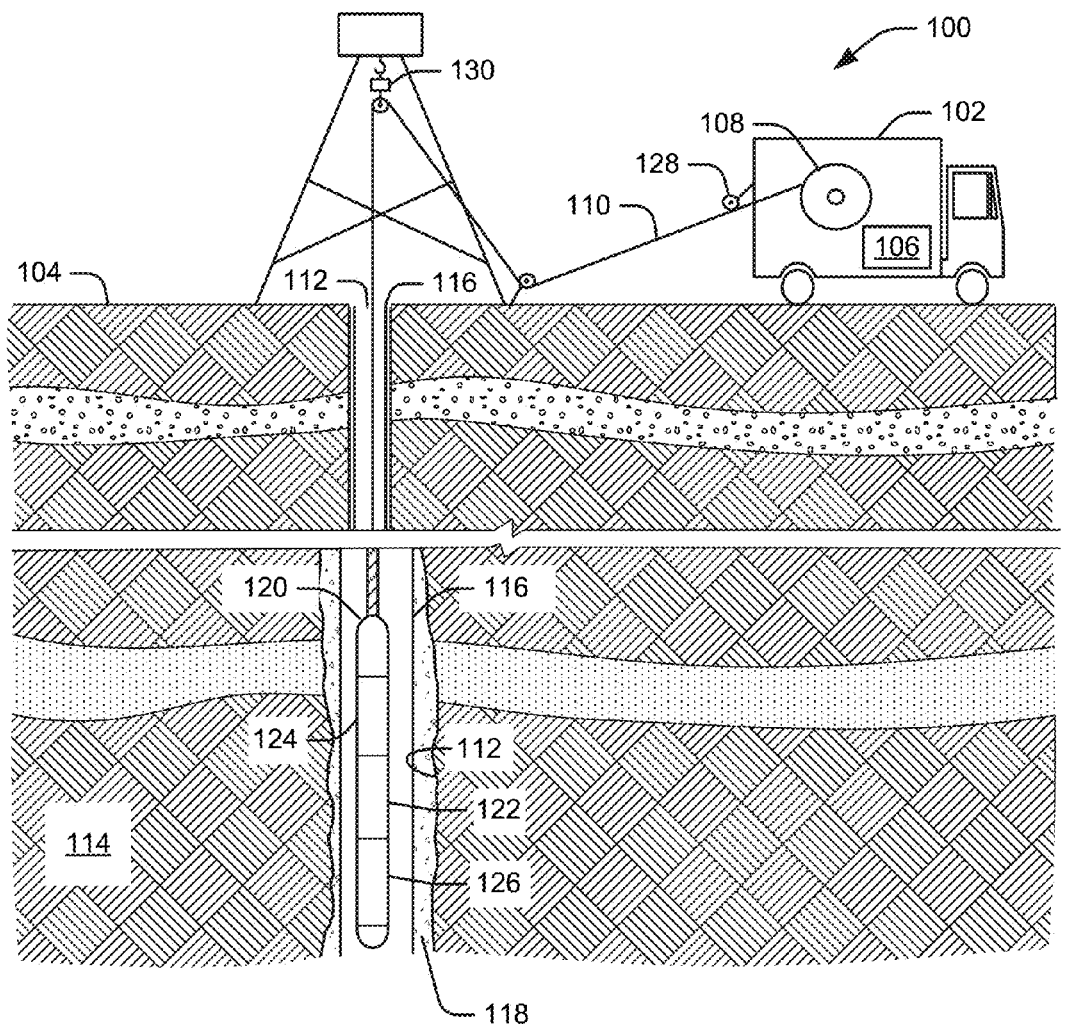
FIG. 1 is a schematic diagram of a well site showing a logging tool that is suspended from a wireline and disposed internally of a bore hole.

In one embodiment of a wireline well logging system 100 at a well site, as depicted in FIG. 1, a logging truck or skid 102 on the earth's surface 104 houses a data gathering computer 106 and a winch 108 from which a wireline cable 110 extends into a well bore 112 drilled into a formation 114. In one embodiment, the well bore 112 is lined with a conductive casing 116 that conducts electricity. In one embodiment, the space between the well bore 112 and the casing 116 is filled with cement 118.

In one embodiment, the wireline cable 110 suspends a logging toolstring 120 within the well bore 112 to measure formation data as the logging toolstring 120 is raised or lowered by the wireline cable 110. In one embodiment, the logging toolstring 120 is conveyed into the well bore 112 by coiled tubing (not shown). In one embodiment, in which the well bore 112 is a deviated well, the logging toolstring 120 is conveyed into the well bore 112 by a tractor (not shown). In one embodiment, the logging toolstring 120 includes a resistivity logging tool 122 and several other tools and sensors 124, 126.

In one embodiment, in addition to conveying the logging toolstring 120 into the well, the wireline cable 110 provides a link for power and communications between the surface equipment, e.g., data gathering computer 106, and the logging toolstring 120.

In one embodiment, as the logging tool 120 is raised or lowered within the well bore 112, a depth encoder 128 provides a measured depth of the extended cable. In one embodiment, a tension load cell 130 measures tension in the wireline cable 110 at the surface 104.

Several non-limiting embodiments of the resistivity logging tool 122 are illustrated in FIGS. 2-5, in which the other elements of the logging toolstring 120 have been omitted for simplicity. As can be seen in FIG. 2, in one embodiment, the resistivity logging tool 122 includes two transmitters ("T1" and "T2") 202, 204, two receivers ("R1" and "R2") 206, 208, and an electronics module ("EL") 210. In one embodiment, shown in FIG. 2, T1 202 is located at the top of the resistivity logging tool 122, T2 204 is located at the bottom of the resistivity tool 122, and R1 and R2 are between T1 and T2. While EL 210 is shown at the bottom of the resistivity tool 122, it can be located anywhere in the resistivity tool 122.

The order of the transmitters 202, 204 and receivers 206, 208 in the resistivity logging tool 122 is different in FIGS. 3-5. In one embodiment, illustrated in FIG. 3, T1 202 is at the top of the resistivity logging tool 122, followed in order by R1 206, T2 204, and R2 208. In one embodiment, illustrated in FIG. 4, T1 202 is at the top of the resistivity logging tool 122, followed in order by T2 204, R1 206, and R2 208. In one embodiment, illustrated in FIG. 5, R1 206 is at the top of the resistivity logging tool 122, followed in order by T1 202, T2 204, and R2 208.

In one embodiment (not shown), the number of receivers and/or transmitters is greater than that shown in FIGS. 2-5.

In all of the embodiments shown in FIGS. 2-5, the conductive casing 116 is between the transmitters and receivers 202, 204, 206, 208 and the formation 114 that the resistivity logging tool is to investigate. In the embodiments shown in FIGS. 2-5, the conductive casing 116 extends indefinitely above and below (in the perspective of the drawing) the resistivity logging tool 122. In one embodiment, the conductive casing 116 does not extend indefinitely but only extends to the extent that it effects electromagnetic transmissions from T1 202 and T2 204 into the formation 114 in the same way and/or it effects electromagnetic transmissions from the formation 114 to R1 206 and R2 208 in the same way.

Figure 6:
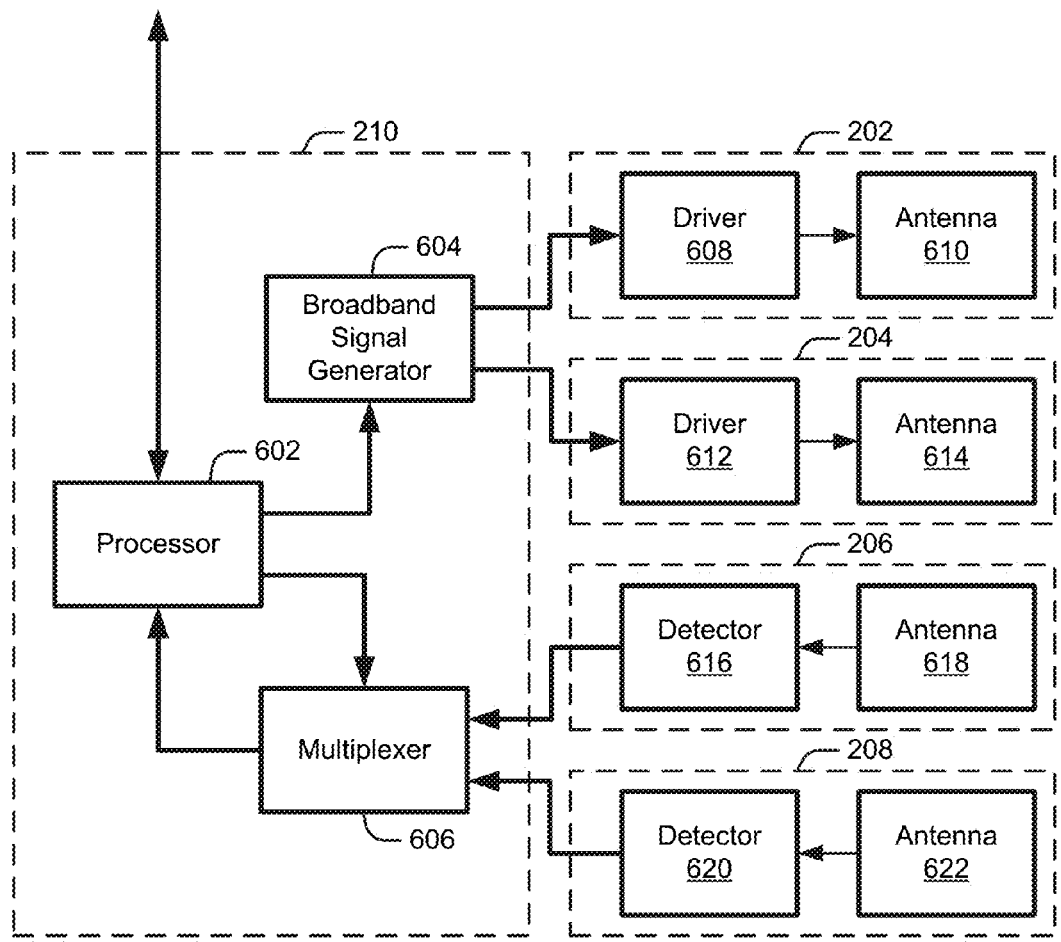
FIG. 6 is a block diagram.

In one embodiment, the components shown in FIGS. 2-5 are connected as shown in the block diagram shown in FIG. 6. In one embodiment, the electronics module 210 includes a processor 602. In one embodiment, the processor 602 is a microprocessor or microcontroller and includes, either internally or separately, the memory and input/output necessary to accomplish the functions described herein.

In one embodiment, the electronics module 210 includes a broadband signal generator 604. In one embodiment, the broadband signal generator 604 provides generates a broadband signal, such as an impulse, a step function, a square wave, a Gaussian function, and other functions capable of generating a broadband signal. In one embodiment, a broadband signal is defined to be a signal that varies in time such that the energy in the signal is spread over a broad bandwidth in the frequency domain. In one embodiment, a broadband signal is not representable by in the frequency domain by a tone or a small number (i.e., less than 100) of tones.

In one embodiment, the broadband signal generator 604 generates one of a plurality of broadband signals as commanded by the processor 602 and delivers the broadband signals to T1 202 or T2 204 as commanded by the processor 618. In one embodiment in which T1 202 or T2 204 is acting as a steerable transmitter or a phased array, the broadband signal generator 620 provides a plurality of signals to T1 202 or T2 204 as necessary to perform the steering function.

In one embodiment, the electronics module 210 includes a multiplexer 606 that selects a signal from R1 206 or R2 208 as commanded by the processor 618, conditions it, and delivers it to the processor 618. In one embodiment, conditioning the signal includes filtering the signal, sampling the signal, processing the signal to remove noise, and/or converting the signal to a form that can be provided to the processor (e.g. transistor-transistor logic ("TTL") signal levels or complementary metal-oxide-semiconductor ("CMOS") signal levels).

In one embodiment, T1 202 includes a driver 608 that converts the broadband signal or signals from the broadband signal generator 604 into the appropriate signal to drive an antenna 610.

In one embodiment, T2 204 includes a driver 612 that converts the broadband signal or signals from the broadband signal generator 604 into the appropriate signal to drive an antenna 614.

In one embodiment, R1 206 includes a detector 616 that detects the signal or signals received by an antenna 618 and converts it to a signal that is acceptable to the multiplexer 606.

In one embodiment, R2 208 includes a detector 620 that detects the signal or signals received by an antenna 622 and converts it to a signal that is acceptable to the multiplexer 622.

In one embodiment, antennas 610, 614, 618, and 622 are transducers that provide an efficient coupling of energy from the drivers 608 and 612 into the formation 114 and from the formation 114 into the detectors 616 and 620. In one embodiment, antennas 610, 614, 618, and 622 are not steerable. In one embodiment, antennas 610, 614, 618, and 622 are directional.

Figure 7:
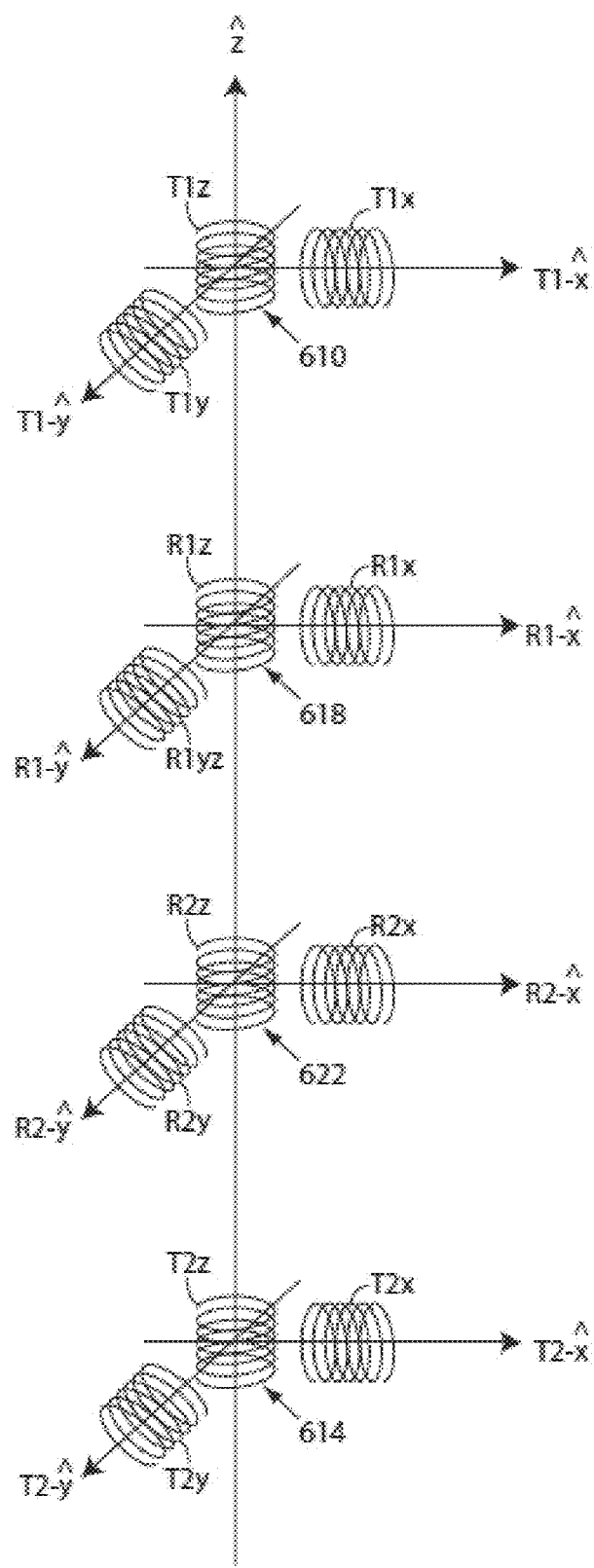
FIGS. 7 and 8 illustrate antenna arrays.
Figure 8:
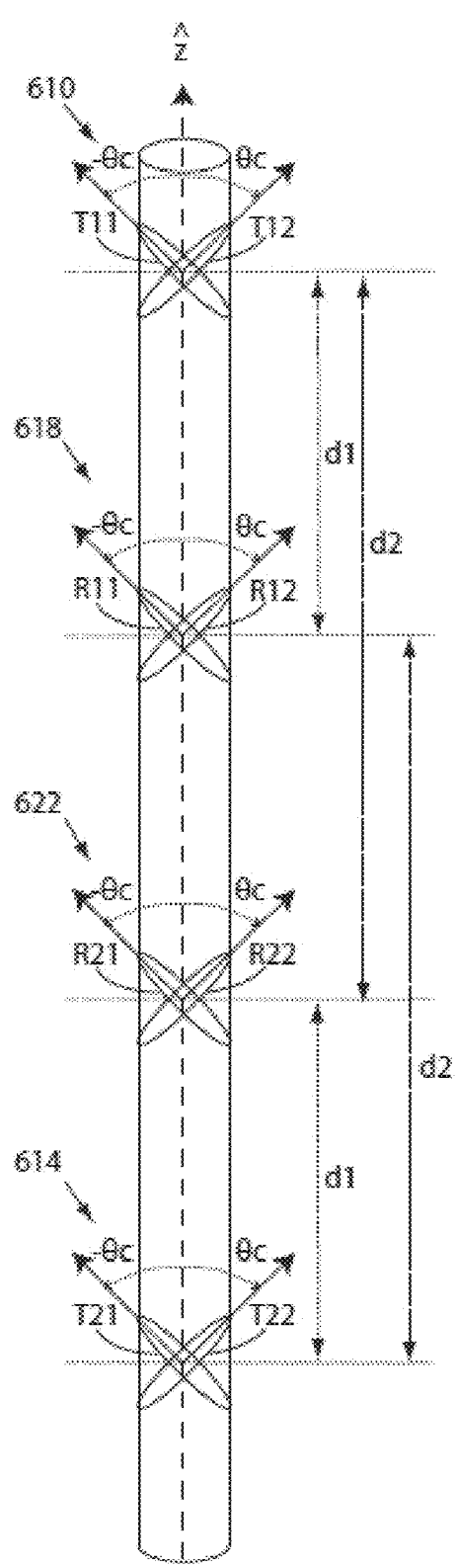

In the embodiments shown in FIGS. 7 and 8, the antennas are steerable.

In one embodiment, shown in FIG. 7, antenna 610 includes three orthogonal coil antennas T1$x$, T1$y$, and T1$z$. In one embodiment, antenna T1$x$ has a longitudinal axis oriented along an x-axis, T1-$\hat{x}$. In one embodiment, antenna T1$y$ has a longitudinal axis oriented along a y-axis, T1-$\hat{y}$. In one embodiment, antenna T1$z$ has a longitudinal axis oriented along a z-axis, $\hat{z}$.

In one embodiment, antenna 614 includes three orthogonal coil antennas T2$x$, T2$y$, and T2$z$. In one embodiment, antenna T2$x$ has a longitudinal axis oriented along an x-axis, T2-$\hat{x}$. In one embodiment, antenna T2$y$ has a longitudinal axis oriented along a y-axis, T2-$\hat{y}$. In one embodiment, antenna T2$z$ has a longitudinal axis oriented along the z-axis, $\hat{z}$.

In one embodiment, antenna 618 includes three orthogonal coil antennas R1$x$, R1$y$, and R1$z$. In one embodiment, antenna R1$x$ has a longitudinal axis oriented along an x-axis, R1-$\hat{x}$. In one embodiment, antenna R1$y$ has a longitudinal axis oriented along a y-axis, R1-$\hat{y}$. In one embodiment, antenna R1$z$ has a longitudinal axis oriented along the z-axis, $\hat{z}$.

In one embodiment, antenna 622 includes three orthogonal coil antennas R2$x$, R2$y$, and R2$z$. In one embodiment, antenna R2$x$ has a longitudinal axis oriented along an x-axis, R2-$\hat{x}$. In one embodiment, antenna R2$y$ has a longitudinal axis oriented along a y-axis, R2-$\hat{y}$. In one embodiment, antenna R2$z$ has a longitudinal axis oriented along the z-axis, $\hat{z}$.

In one embodiment, illustrated in FIG. 8, antenna 610 includes two tilted-array antennas T11 and T12. In one embodiment, antenna T11 is one or more loops of wire tilted at an angle $-\theta c$ to a z-axis, $\hat{z}$. In one embodiment, antenna T12 is one or more loops of wire tilted at an angle $\theta c$ to the z-axis, $\hat{z}$.

In one embodiment, antenna 614 includes two tilted-array antennas T21 and T22. In one embodiment, antenna T21 is one or more loops of wire tilted at an angle $-\theta c$ to a z-axis, $\hat{z}$. In one embodiment, antenna T22 is one or more loops of wire tilted at an angle $\theta c$ to the z-axis, $\hat{z}$.

In one embodiment, antenna 618 includes two tilted-array antennas R11 and R12. In one embodiment, antenna R11 is one or more loops of wire tilted at an angle $-\theta c$ to a z-axis, $\hat{z}$. In one embodiment, antenna R12 is one or more loops of wire tilted at an angle $\theta c$ to the z-axis, $\hat{z}$.

In one embodiment, antenna 622 includes two tilted-array antennas R21 and R22. In one embodiment, antenna R21 is one or more loops of wire tilted at an angle $-\theta c$ to a z-axis, $\hat{z}$. In one embodiment, antenna R22 is one or more loops of wire tilted at an angle $\theta c$ to the z-axis, $\hat{z}$.

In one embodiment, the tilted array antennas T11 and T12 are a distance d1 from the tilted array antennas R11 and R12 and a distance d2 from the tilted array antennas R21 and R22. In one embodiment, the tilted array antennas T21 and T22 are a distance d1 from the tilted array antennas R21 and R22 and a distance d2 from the tilted array antennas R11 and R12.

That is, in one embodiment, the antennas associated with T1 are at substantially the same distance (d1) from the antennas associated with R1 as the antennas associated with T2 are from the antennas associated with R2. Similarly, in one embodiment, the antennas associated with T1 are at substantially the same distance (d2) from the antennas associated with R2 as the antennas associated with T2 are from the antennas associated with R1. In one embodiment, "substantially the same distance" means within 10 percent. In one embodiment, "substantially the same distance" means within 5 percent. In one embodiment, "substantially the same distance" means within 1 percent.

Note that in FIGS. 7 and 8, the antennas are arranged in the order shown in FIG. 2, with T1 at the top, followed by R1, R2, and T2. The arrangement of the antennas in the orders shown in FIGS. 3-5 are apparent from those drawings.

Using the arrangement shown in FIGS. 6-8, antenna arrays with two transmitters and two receivers can be used within a conductive cased well to send and receive broadband time-domain (transient) signals. The order of the antennas within the antenna array can be varied, as shown in FIGS. 2-5.

In one embodiment, a frequency-domain compensated signal is defined as follows (equation 1):

$$S(f)^{compensated} = \frac{V(f)_{R1T1}^{casing}/V(f)_{R1T2}^{casing}}{V(f)_{R2T1}^{casing}/V(f)_{R2T2}^{casing}} \cong \frac{V(f)_{R1T1}^{no\text{-}casing}/V(f)_{R1T2}^{no\text{-}casing}}{V(f)_{R2T1}^{no\text{-}casing}/V(f)_{R2T2}^{no\text{-}casing}}$$

where:
$V(f)_{ij}^{casing}$ is the measured signal response at receiver i due to transmitter j in the frequency domain, and
$V(f)_{ij}^{no\text{-}casing}$ is the ideal signal response at receiver i due to transmitter j in the absence of conductive casing in the frequency domain.

In other words, Equation (1) is a square of a geometric mean of two sets of signals received by different transmitters.

When all of the measured signal responses are similarly affected by the conductive casing, $S(f)^{compensated}$ reduces or removes the effect of the casing, as described in U.S. Pat. No. 6,294,917. Since casing effects are efficiently minimized through Equation (1), compensated signals yield reliable resistivity and deep measurement behind the casing.

An time-domain compensated signal that is equivalent to Equation (1) is:

$$S(t)_a = V(t)_{R1T1}^{casing} \otimes IFFT\left\{\frac{1}{FFT[V(t)_{R2T1}^{casing}]}\right\} \quad (2\text{-}a)$$

-continued $$S(t)_b = V(t)_{R2T2}^{casing} \otimes IFFT\left\{\frac{1}{FFT[V(t)_{R1T2}^{casing}]}\right\} \quad (2\text{-}b)$$

$$S(t)^{compensated} = S(t)_a \otimes S(t)_b \quad (2\text{-}c)$$

where:

$V(t)_{ij}^{casing}$ is the measured signal response at receiver i due to transmitter j in the time domain, FFT is Fourier transform, IFFT is inverse Fourier transform, and $\otimes$ is time-domain convolution.

The technique described above is not limited to two transmitters and two receivers. If an antenna array with two transmitters and three receivers is used within a conductive cased single-well to send and receive time-domain (transient) signals, an equivalent compensated signal can be calculated as:

$$S^{compensated} = A \cdot \frac{V(f)_{R1T1}^{casing}/V(f)_{R1T2}^{casing}}{V(f)_{R2T1}^{casing}/V(f)_{R2T2}^{casing}} + B \cdot \frac{V(f)_{R2T1}^{casing}/V(f)_{R2T2}^{casing}}{V(f)_{R3T1}^{casing}/V(f)_{R3T2}^{casing}} + \quad (3)$$

$$C \cdot \frac{V(f)_{R3T1}^{casing}/V(f)_{R3T2}^{casing}}{V(f)_{R1T1}^{casing}/V(f)_{R1T2}^{casing}}$$

$$\cong A \cdot \frac{V(f)_{R1T1}^{no\text{-}casing}/V(f)_{R1T2}^{no\text{-}casing}}{V(f)_{R2T1}^{no\text{-}casing}/V(f)_{R2T2}^{no\text{-}casing}} +$$

$$B \cdot \frac{V(f)_{R2T1}^{no\text{-}casing}/V(f)_{R2T2}^{no\text{-}casing}}{V(f)_{R3T1}^{no\text{-}casing}/V(f)_{R3T2}^{no\text{-}casing}} +$$

$$C \cdot \frac{V(f)_{R3T1}^{no\text{-}casing}/V(f)_{R3T2}^{no\text{-}casing}}{V(f)_{R1T1}^{no\text{-}casing}/V(f)_{R1T2}^{no\text{-}casing}}$$

$$S(t)_a = V(t)_{R1T1}^{casing} \otimes IFFT\left\{\frac{1}{FFT[V(t)_{R2T1}^{casing}]}\right\} \quad (4\text{-}a)$$

$$S(t)_b = V(t)_{R2T2}^{casing} \otimes IFFT\left\{\frac{1}{FFT[V(t)_{R1T2}^{casing}]}\right\} \quad (4\text{-}b)$$

$$S(t)_c = V(t)_{R2T1}^{casing} \otimes IFFT\left\{\frac{1}{FFT[V(t)_{R3T1}^{casing}]}\right\} \quad (4\text{-}c)$$

$$S(t)_d = V(t)_{R3T2}^{casing} \otimes IFFT\left\{\frac{1}{FFT[V(t)_{R2T2}^{casing}]}\right\} \quad (4\text{-}d)$$

$$S(t)_e = V(t)_{R3T1}^{casing} \otimes IFFT\left\{\frac{1}{FFT[V(t)_{R1T1}^{casing}]}\right\} \quad (4\text{-}e)$$

$$S(t)_f = V(t)_{R1T2}^{casing} \otimes IFFT\left\{\frac{1}{FFT[V(t)_{R3T2}^{casing}]}\right\} \quad (4\text{-}f)$$

$$S(t)^{compensated} = A*S(t)_a \otimes S(t)_b + B*S(t)_c \otimes S(t)_d + C*S(t)_e \otimes S(t)_f \quad (4\text{-}g)$$

Where A, B, C are weighting coefficients, which are adjusted to achieve optimal compensation signals. As a simple example, setting A=1 and B=C=0, causes the processing of signals sent only from T1 and T2 and collected at R1 and R2. In one embodiment, the weighting coefficients (A, B, C, and additional weighting coefficients due to additional transmitters and receivers) have non-zero values and the processing is of signals transmitted from all transmitters and received through all receivers. In one embodiment, the weighting coefficients are varied systematically to minimize the least squares difference between observed data and the data from an inversion procedure applied to the compensation signals.

Figure 9:
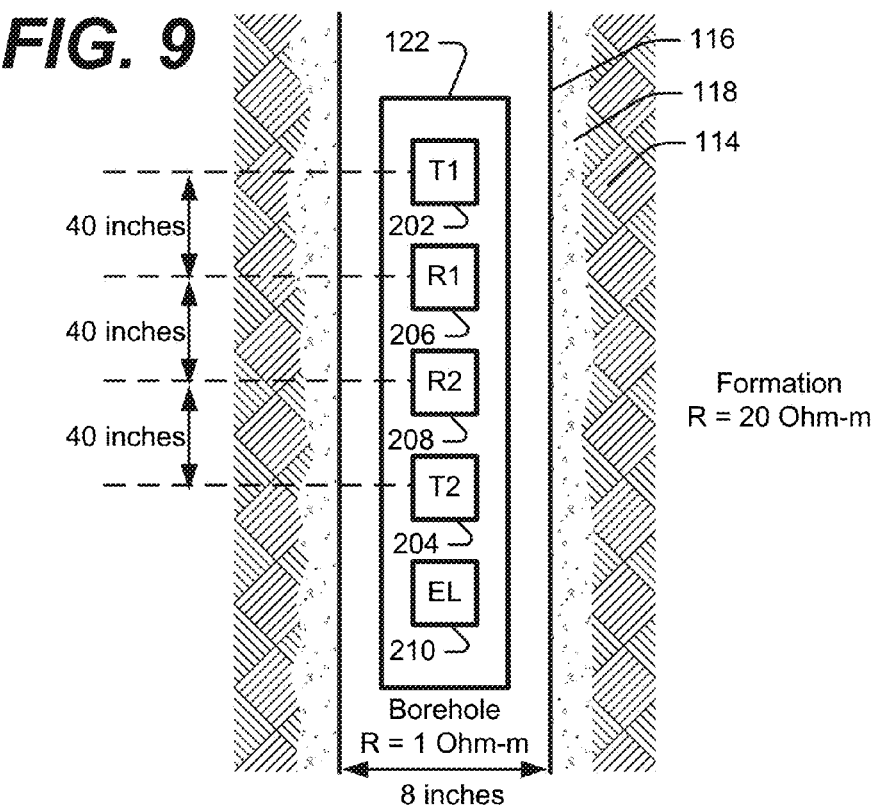
FIG. 9 shows an experimental arrangement.

The efficiency of the time-domain compensation method is validated by a numerical example. A sample logging tool with a conductive casing placed in a homogeneous formation model is shown in FIG. 9, which has the same configuration shown in FIG. 2. In the model:

casing thickness is set to 0.1 inch,
casing conductivity is set to $5 \cdot 10^6$ Siemens/meter (S/m),
casing diameter is set to 8 inches.
spacing between T1 202 and R1 206 is set to 40 inches,
spacing between R1 206 and R2 208 is set to 40 inches,
spacing between R2 208 and T2 204 is set to 40 inches,
bore hole resistance is set to 1 Ohm-m, and
formation resistance is set to 20 Ohm-m.

Figure 10:
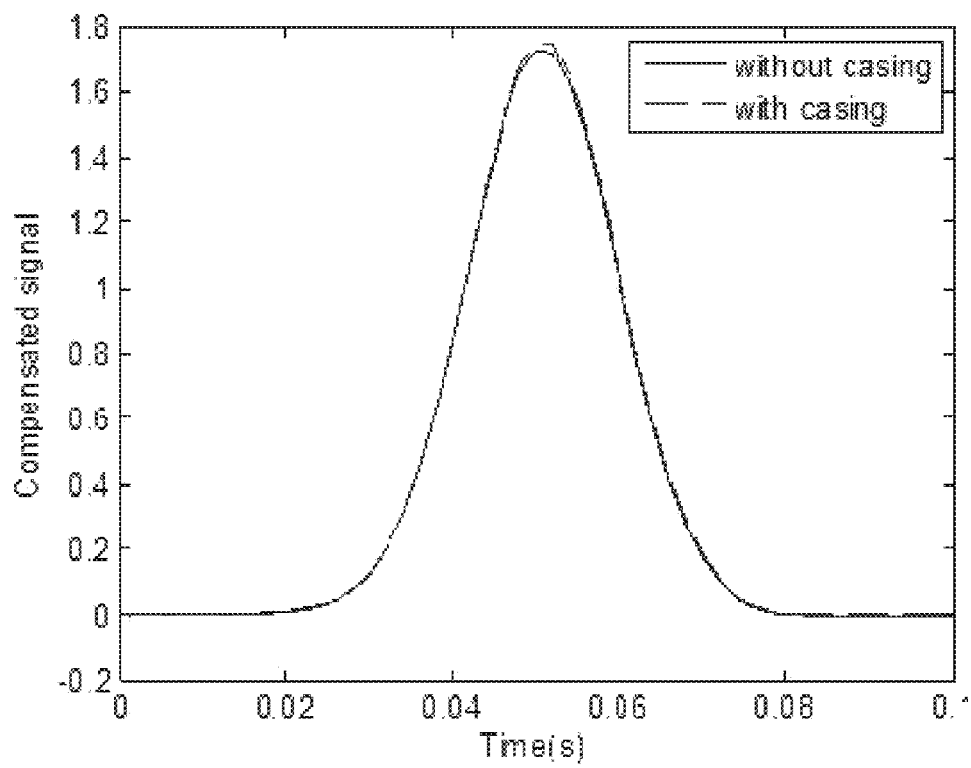
FIG. 10 illustrates experimental results.

A Gaussian transient pulse is excited at the transmitters T1 202 and T2 204 to generate a band of low frequencies. In FIG. 10, the calculated transient signal after compensation processing (the dashed line) is compared with the transient signal for the same formation model without existence of conductive casing (the solid line). It can be observed from the FIG. 10 that compensated transient signals from the model with the conductive casing are close to those signals generated from the model without the casing. In other words, the compensated transient signal shows no significant effect from conductive casing.

The spacing between the transmitters (T1 202 and T2 204) and receivers (R1 206 and R2 208) shown in FIG. 9 is for illustration purposes only and, in one embodiment, for measuring formation properties near the well bore 112. In one embodiment, the spacing between the transmitters (T1 202 and T2 204) and receivers (R1 206 and R2 208) is set between 10 and 50 feet.

Moreover, casing-effect reduced transient signals with different detection resolutions and reading ranges can be computed from different combinations of transmitters and receivers. Deep resistivity reading logging can be achieved.

Calculated compensated signals can be used to predict parameters of the surrounding reservoir 114 using an inversion algorithm that minimizes the differences between compensated signals and simulated signals from a forward modeling program or a pre-simulated library. Since casing effects have been significantly reduced by using compensated signals, enhanced inversion performance and accurate reservoir prediction can be expected.

In general, this time-domain compensation processing method can be applied to all time-domain/transient casedhole resistivity logging applications including cross-well, borehole-to-surface, etc. The method described above can be applied to a sensor array of multiple transmitter-antennas/receiver-antennas, which can be either magnetic or electric dipoles. Transmitter antenna 610, 614 and receiver antenna 618, 622 orientations can be vertical, horizontal, and titled. The placement of transmitters 202, 204 and receivers 206, 208 is not limited to those shown in FIGS. 2-5. For example, the above time-domain compensation method can be employed to transmitter/receiver antenna arrays with capability of azimuth sensitivity, such as those shown in FIGS. 7 and 8. The configurations shown in FIGS. 7 and 8 can enable azimuth sensing capability of through-casing logging and provide comprehensive 3D imaging of surrounding formation.

Figure 11:
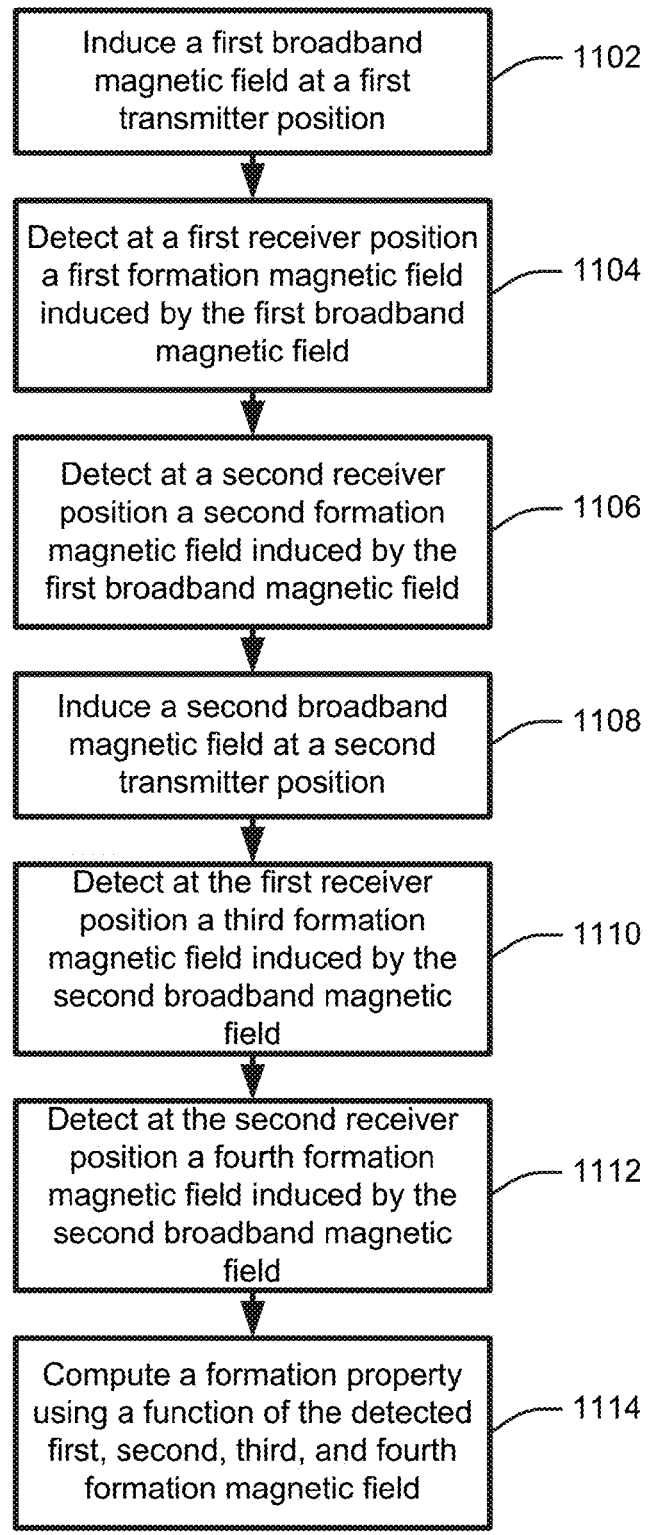
FIG. 11 is a flow chart.

In one embodiment of use, illustrated in FIG. 11, a first broadband magnetic field is induced at a first transmitter position (e.g., the position of T1 202 or the position of T2 204 in FIGS. 2-5) in a well bore (e.g., well bore 112 in FIG. 1) drilled through a formation (e.g., formation 114 in FIG. 1)(block 1102). In one embodiment, a first formation magnetic field ($V_{R1T1}^{casing}$) induced by the first broadband magnetic field in the formation is detected at a first receiver position (e.g., the position of R1 206 or the position of R2 208 in FIGS. 2-5) in the well bore (block 1104). In one embodiment, a second formation magnetic field ($V_{R2T1}^{casing}$) induced by the first broadband magnetic field in the formation is detected at a second receiver position (e.g., the position of R1 206 or the position of R2 208 in FIGS. 2-5) in the well bore (block 1106). In one embodiment, a second broadband magnetic field is induced at a second transmitter position (e.g., the position of T1 202 or the position of T2 204 in FIGS. 2-5) in the well bore (block 1108). In one embodiment, a third formation magnetic field ($V_{R1T2}^{casing}$) induced by the second broadband magnetic field in the formation is detected at the first receiver position in the well bore (block 1110). In one embodiment, a fourth formation magnetic field ($V_{R2T2}^{casing}$) induced by the second broadband magnetic field in the formation is detected at the second receiver position in the well bore (block 1112). In one embodiment, a formation property, such as formation resistivity or formation density, is computed using a function of $V_{R1T1}^{casing}$, $V_{R2T1}^{casing}$, $V_{R1T2}^{casing}$, and $V_{R2T2}^{casing}$, using for example equations (2) or (4) above, wherein the function reduces the effect of a casing on the computation of the formation property (block 1114).

In one embodiment, the formation property is used to plan an activity related to the formation. In one embodiment, the activity is mapping the reservoir 114. In one embodiment, the activity is to identify reservoir boundaries, an approaching water front, and/or other properties of the reservoir 114. In one embodiment, the resistivity logging tool 122 is installed in a permanent installation inside the conductive casing 116 in a producing well and the activity is real-time monitoring of production and/or mapping an approaching waterfront that could impact production.

In one embodiment, the plan is executed.

Figure 12:
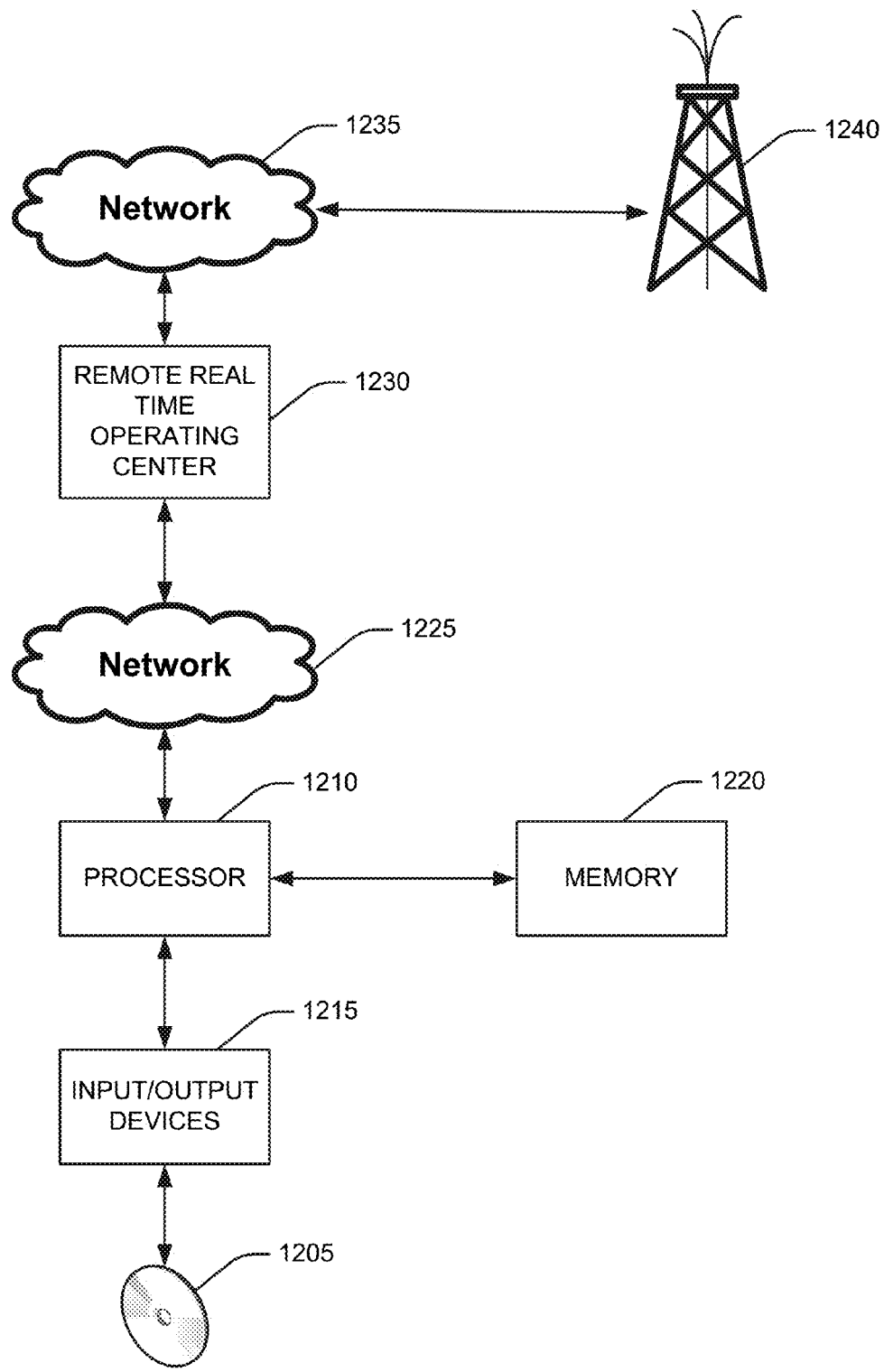
FIG. 12 shows an environment.

In one embodiment, shown in FIG. 12, the resistivity logging tool 122 is controlled by software in the form of a computer program on a non-transitory computer readable media 1205, such as a CD, a DVD, a USB drive, a portable hard drive or other portable memory. In one embodiment, a processor 1210, which may be the same as or included in the processor 618 (see FIG. 6) or data gathering computer 106 (see FIG. 1), reads the computer program from the computer readable media 1205 through an input/output device 1215 and stores it in a memory 1220 where it is prepared for execution through compiling and linking, if necessary, and then executed. In one embodiment, the system accepts inputs through an input/output device 1215, such as a keyboard or keypad, mouse, touchpad, touch screen, etc., and provides outputs through an input/output device 1215, such as a monitor or printer. In one embodiment, the system stores the results of calculations in memory 1220 or modifies such calculations that already exist in memory 1220.

In one embodiment, the results of calculations that reside in memory 1220 are made available through a network 1225 to a remote real time operating center 1230. In one embodiment, the remote real time operating center 1230 makes the results of calculations available through a network 1235 to help in the planning of oil wells 1240 or in the drilling of oil wells 1240.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method, comprising
inducing a first broadband magnetic field at a first transmitter position of a transmitter coupled to a tool in a well bore drilled through a formation;
detecting at a first receiver position of a first receiver coupled to the tool in the well bore a first formation magnetic field ($V_{R1T1}^{casing}$) induced by the first broadband magnetic field in the formation;
detecting at a second receiver position of a second receiver coupled to the tool in the well bore a second formation magnetic field ($V_{R2T1}^{casing}$) induced by the first broadband magnetic field in the formation;
inducing a second broadband magnetic field at a second transmitter position in the well bore;
detecting at the first receiver position in the well bore a third formation magnetic field ($V_{R1T2}^{casing}$) induced by the second broadband magnetic field in the formation;
detecting at the second receiver position in the well bore a fourth formation magnetic field ($V_{R2T2}^{casing}$) induced by the second broadband magnetic field in the formation;
computing a formation property using a function of $V_{R1T1}^{casing}$, $V_{R2T1}^{casing}$, $V_{R1T2}^{casing}$, and $V_{R2T2}^{casing}$, wherein the function reduces the effect of a casing on the computation of the formation property;
using the formation property to plan an activity related to the formation; and
executing the plan.

2. The method of claim 1 wherein:
the first broadband magnetic field is selected from the group consisting of an impulse function, a step function, a Gaussian function, and a transient function; and
the second broadband magnetic field is selected from the group consisting of an impulse function, a step function, a Gaussian function, and a transient function.

3. The method of claim 1 wherein:
the function comprises using a Fourier Transform process, an Inverse Fourier Transform process, and a convolution.

4. The method of claim 1 wherein:
the function comprises:

$$S(t)_a = V(t)_{R1T1}^{casing} \otimes IFFT\left\{\frac{1}{FFT[V(t)_{R2T1}^{casing}]}\right\}$$

$$S(t)_b = V(t)_{R2T2}^{casing} \otimes IFFT\left\{\frac{1}{FFT[V(t)_{R1T2}^{casing}]}\right\}$$

$$S(t)^{compensated} = S(t)_a \otimes S(t)_b$$

where:
FFT is Fourier transform,
IFFT is inverse Fourier transform, and
$\otimes$ is time-domain convolution.

5. The method of claim 1 wherein:
computing the formation property comprises computing a resistivity of the formation.

6. A computer program stored in a non-transitory computer readable storage medium, the program comprising executable instructions that cause a computer to:
induce a first broadband magnetic field at a first transmitter position of a transmitter coupled to a tool in a well bore drilled through a formation;
detect at a first receiver position of a first receiver coupled to the tool in the well bore a first formation magnetic field ($V_{R1T1}^{casing}$) induced by the first broadband magnetic field in the formation;
detect at a second receiver position of a second receiver coupled to the tool in the well bore a second formation magnetic field ($V_{R2T1}^{casing}$) induced by the first broadband magnetic field in the formation;
induce a second broadband magnetic field at a second transmitter position in the well bore;
detect at the first receiver position in the well bore a third formation magnetic field ($V_{R1T2}^{casing}$) induced by the second broadband magnetic field in the formation;
detect at the second receiver position in the well bore a fourth formation magnetic field ($V_{R2T2}^{casing}$) induced by the second broadband magnetic field in the formation; and
compute a formation property using a function of $V_{R1T1}^{casing}$, $V_{R2T1}^{casing}$, $V_{R1T2}^{casing}$, and $V_{R2T2}^{casing}$, wherein the function reduces the effect of a casing on the computation of the formation property.

7. The computer program of claim 6 wherein:
the first broadband magnetic field is selected from the group consisting of an impulse function, a step function, and a Gaussian function; and
the second broadband magnetic field is selected from the group consisting of an impulse function, a step function, and a Gaussian function.

8. The computer program of claim 6 wherein:
the function comprises using a Fourier Transform process, an Inverse Fourier Transform process, and a convolution.

9. The computer program of claim 6 wherein:
the function comprises:

$$S(t)_a = V(t)_{R1T1}^{casing} \otimes IFFT\left\{\frac{1}{FFT[V(t)_{R2T1}^{casing}]}\right\}$$

$$S(t)_b = V(t)_{R2T2}^{casing} \otimes IFFT\left\{\frac{1}{FFT[V(t)_{R1T2}^{casing}]}\right\}$$

$$S(t)^{compensated} = S(t)_a \otimes S(t)_b$$

where:
FFT is Fourier transform,
IFFT is inverse Fourier transform, and
$\otimes$ is time-domain convolution.

10. The computer program of claim 6 wherein:
computing the formation property comprises computing a resistivity of the formation.

11. An apparatus comprising:
a tool housing, wherein the tool housing has a longitudinal axis;
a first transmitter antenna ("T1") mounted in the tool housing;
a second transmitter antenna ("T2") mounted in the tool housing;
a first receiver antenna ("R1") mounted in the tool housing;
a second receiver antenna ("R2") mounted in the tool housing;
a processor;
a broadband signal generator coupled to the processor and selectively coupleable to T1 and T2, wherein the processor controls the selection;
a receiver coupled to the processor and selectively coupleable to R1 and R2, wherein the processor controls the selection;
the processor including a process to, when the tool housing is in a well bore through a formation, the well lined by a casing:
induce a first broadband magnetic field in T1;
receive through R1 and the receiver a first formation magnetic field ($V_{R1T1}^{casing}$) induced by the first broadband magnetic field;
receive through R2 and the receiver a second formation magnetic field ($V_{R2T1}^{casing}$) induced by the first broadband magnetic field;
induce a second broadband magnetic field in T2;
receive through R1 and the receiver a third formation magnetic field ($V_{R1T2}^{casing}$) induced by the second broadband magnetic field;
receive through R2 and the receiver a fourth formation magnetic field ($V_{R2T2}^{casing}$) induced by the second broadband magnetic field;
compute a formation property using a function of $V_{R1T1}^{casing}$, $V_{R2T1}^{casing}$, $V_{R1T2}^{casing}$, and $V_{R2T2}^{casing}$, wherein the function reduces the effect of the casing on the computation of the formation property.

12. The apparatus of claim 11 wherein:
T1 is displaced from R1 along the longitudinal axis of the tool by substantially the same distance that T2 is displaced from R2 along the longitudinal axis of the tool; and
T1 is displaced from R2 along the longitudinal axis of the tool by substantially the same distance that T2 is displaced from R1 along the longitudinal axis of the tool.

13. The apparatus of claim 11 wherein:
at least one of T1, T2, R1, and R2 comprises three orthogonal loop antennas.

14. The apparatus of claim 11 wherein:
at least one of T1, T2, R1, and R2 comprises two loop antennas, wherein:
each loop antenna has an axis orthogonal to the loop; and
the angle between the axes of the two loop antennas is between 0 and 90 degrees.

15. The apparatus of claim 14 wherein:
the angle between the axes of the two loop antennas is approximately 45 degrees.

16. The apparatus of claim 11 wherein:
the first broadband magnetic field is selected from the group consisting of an impulse function, a step function, and a Gaussian function; and
the second broadband magnetic field is selected from the group consisting of an impulse function, a step function, and a Gaussian function.

17. The apparatus of claim 11 wherein:
the function comprises using a Fourier Transform process, an Inverse Fourier Transform process, and a convolution.

18. The apparatus of claim 11 wherein:
the function comprises:

$$S(t)_a = V(t)_{R1T1}^{casing} \otimes IFFT\left\{\frac{1}{FFT[V(t)_{R2T1}^{casing}]}\right\}$$

$$S(t)_b = V(t)_{R2T2}^{casing} \otimes IFFT\left\{\frac{1}{FFT[V(t)_{R1T2}^{casing}]}\right\}$$

$$S(t)^{compensated} = S(t)_a \otimes S(t)_b$$

where:
FFT is Fourier transform,
IFFT is inverse Fourier transform, and
$\otimes$ is time-domain convolution.

19. The apparatus of claim 11 wherein:
computing a formation property comprises computing resistivity of a formation.

* * * * *